United States Patent [19]
Siegrist et al.

[11] 3,849,163
[45] Nov. 19, 1974

[54] PROCESS FOR THE OPTICAL BRIGHTENING OF ORGANIC MATERIALS

[75] Inventors: Adolf Emil Siegrist, Basel; Peter Liechti, Binningen; Erwin Maeder, Aesch/Bl.; Leonardo Guglielmetti, Birsfelden; Hans Rudolf Meyer; Kurt Weber, both of Basel, all of Switzerland

[73] Assignee: Ciba-Geigy AG, Basel, Switzerland

[22] Filed: Oct. 5, 1972

[21] Appl. No.: 295,405

Related U.S. Application Data
[60] Division of Ser. No. 67,967, Aug. 28, 1970, Pat. No. 3,758,462, which is a continuation-in-part of Ser. No. 588,318, Oct. 21, 1966, abandoned.

[30] Foreign Application Priority Data
Oct. 28, 1965   Switzerland.................... 14902/65
July 4, 1966   Switzerland........................ 9649/66

[52] U.S. Cl.................... 117/33.5 T, 117/33.5 R, 117/138.8 F, 96/1.5, 96/1.6, 96/87, 252/301.2 W
[51] Int. Cl. ...................... D06p 5/00, C09b 23/00
[58] Field of Search ........ 117/33.5 T; 252/301.2 W; 96/1.5, 1.6, 87

[56] References Cited
UNITED STATES PATENTS
| | | | |
|---|---|---|---|
| 3,351,592 | 11/1967 | Siegrist et al................... | 117/33.5 T |
| 3,546,217 | 12/1970 | Siegrist et al................... | 117/33.5 T |
| 3,642,783 | 2/1972 | Siegrist et al. .............. | 252/301.2 W |

OTHER PUBLICATIONS
Katayanagi, J. Pharm. Soc. Japan, Vol. 68, pgs. 232–234 (1948).
Crippa et al., Chem. Abstracts, Vol. 42 Cols. 2973 to 2974 (1948) and Vol. 43, Col. 2209 (1949).
Avramoff et al., J. Am. Chem. Soc. Vol. 78, pgs. 4090 to 4096 (1956).
Miyano et al., Chem. Pharm. Bull. Vol. 15, pg. 511 to 514 (1967).

*Primary Examiner*—William D. Martin
*Assistant Examiner*—William R. Trenor
*Attorney, Agent, or Firm*—Joseph G. Kolodny

[57] ABSTRACT

The present invention relates to a process for the optical brightening of organic materials using compounds of the formula

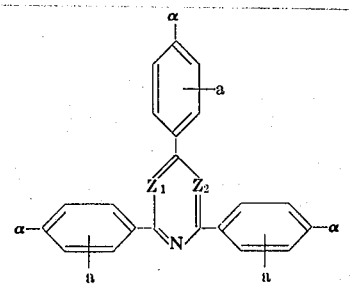

in which $a$ represents hydrogen, halogen, the methyl group or the methoxy group, $Z_1$ and/or $Z_2$ denotes a ring member =CH— or =N— and $\alpha$ represents a hydrogen atom, a phenyl residue or a residue of the series

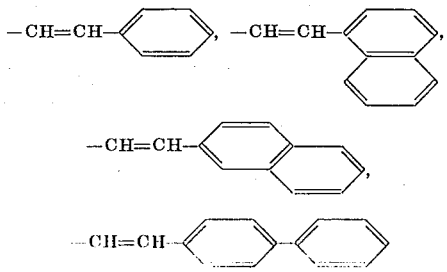

in which (I) at least one residue $\alpha$ differs from hydrogen or phenyl and has the significance of one of the other residues quoted for $\alpha$, and in which (II) terminal phenyl or naphthyl residues may contain alkyl, halogen or alkoxy groups. These new compounds represent valuable optical brightening agents.

8 Claims, No Drawings

PROCESS FOR THE OPTICAL BRIGHTENING OF ORGANIC MATERIALS

CROSS-REFERENCE TO RELATED APPLICATION

This application is a division of copending application Ser. No. 67,967, filed Aug. 28, 1970 (now U.S. Pat. No. 3,758,462) which is, in turn, a continuation-in-part of copending application Ser. No. 588,318, filed Oct. 21, 1966 (now abandoned).

SUMMARY OF THE DISCLOSURE

The present invention relates to a special class of new heterocyclic compounds containing ethylene double bonds as well as to a process for the optical brightening of organic materials with the aid of said special heterocyclic compounds. The new compounds are characterized by the formula (1)

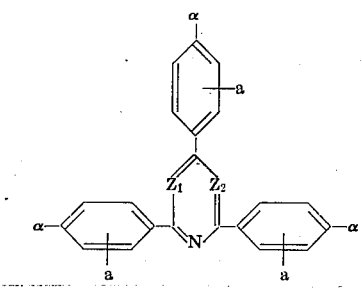

in which $a$ represents hydrogen, halogen, the methyl group or the methoxy group, $Z_1$ and/or $Z_2$ denotes a ring member =CH— or =N— and $\alpha$ represents a hydrogen atom a phenyl residue or a residue of the series

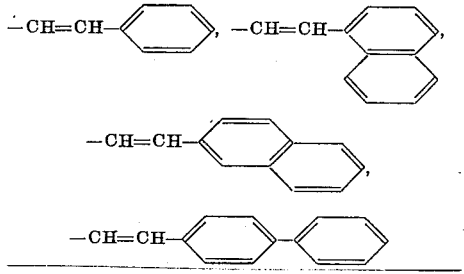

in which (I) at least one residue $\alpha$ differs from hydrogen or phenyl and has the significance of one of the other residues quoted for $\alpha$, and in which (II) terminal phenyl or naphthyl residues may additionally contain 1 to 3 alkyl groups, 1 to 2 halogen atoms, an alkoxy group, a carboxylic acid group, a carboxylic acid ester group or a carboxylic acid amide group. In the process for optical brightening of organic materials the said new compounds are incorporated with the materials to be optically brightened or are applied to the surface thereof. The compounds according to the invention may be s-triazine derivatives, and within this class there are to be mentioned as compounds of special value those which corresponds to the formula:

(2)

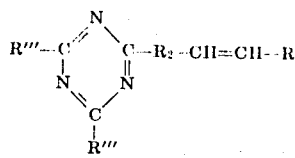

in which $R'''$ denotes an organic residue bonded to the triazine ring by means of a benzene ring, $R_2$ a benzene residue bonded in the 1,4-position to the triazine ring and the —CH= group, and R an aromatic residue.

Of outstanding importance within the scope of the above formula are triazine derivatives of the formula (3)

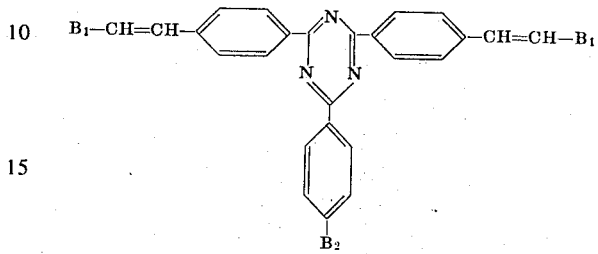

in which $B_1$ represents a phenyl or diphenyl residue and $B_2$ represents hydrogen, a phenyl residue or an alkyl group having 1 to 4 carbon atoms, and in which terminal phenyl residues may contain an alkyl group with 1 to 4 carbon atoms, halogen or a methoxy group.

Interesting compounds of the triazine series can also be represented by the formula (4)

$$A_7-C\underset{N}{\overset{N}{\diagup}}\underset{\underset{A_7}{|}}{\overset{N}{\diagdown}}C-A_6$$

in which $A_6$ denotes a residue of the series (4a) 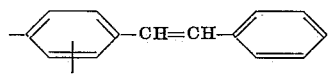

(4b) 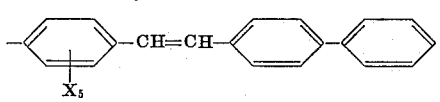

(4c) 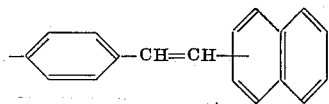

$A_7$ denotes a phenyl, diphenylyl or naphthyl residue or a residue $A_6$, and these quoted aromatic residues may additionally contain 1 to 2 substituents $X_5$ having the significance of hydrogen, alkyl or halogen, preferably in the phenylene nuclei described under $A_6$.

The general formula (1) comprises pyridine and pyrimidine derivatives; of the pyridine derivatives special mention is deserved by those which correspond to the formula (5)

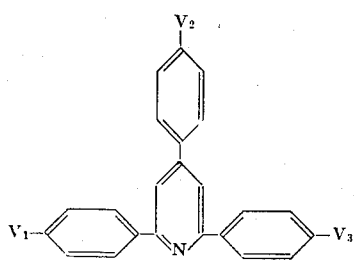

in which $V_1$, $V_2$ or $V_3$ represent hydrogen, a styryl residue or a p-phenylstyryl residue, but in which at least one residue V differs from hydrogen.

Among the pyrimidine derivatives those may be mentioned especially which correspond to the formula (6)

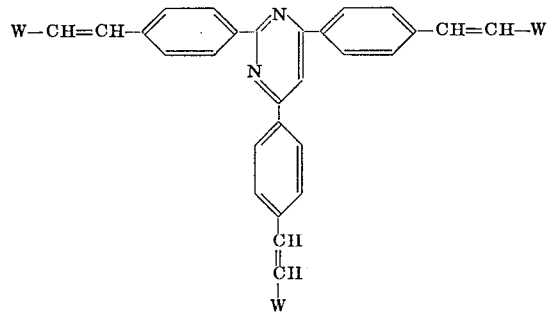

in which W denotes a phenyl, diphenyl, 1-naphthyl or 2-naphthyl residue.

In these formulae quoted under numbers (1) to (6) possible alkyl groups in principle also include long chain alkyl groups, but in practice it is mostly alkyl groups containing up to about 8 carbon atoms, preferably 1 to 4 carbon atoms, and especially branched-chain alkyl groups, which require consideration.

Though again in the case of alkoxy groups higher members, that is to say those containing 4 or more carbon atoms, as well as polyalkyleneoxy groups, are possible, the predominant practical significance resides in alkoxy groups containing 1 to 4 carbon atoms. Amongst the halogens quoted, chlorine is of especial interest. While in the case of the carboxylic acid ester groups, theoretically all esterifying components are possible, in most cases only alkyl esters having 1 to 18 carbon atoms and the benzyl ester are of interest. The carboxylic acid amide groups may be free or mono- or disubstituted in any desired manner. Among the substituted representatives the alkylamides and arylamides having up to 18 carbon atoms as well as cyclic amides (for example of the morpholide type) are the most important. The term "free acids" here of course also comprises salts thereof.

In principle, the compounds defined above which according to this invention are to be used for optical brightening processes can be prepared by different methods.

A particularly advantageous process for the manufacture of compounds of the formula (1) consists in reacting a compound of the formula (7)

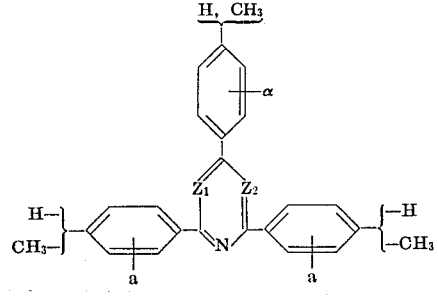

in which the symbols $a$, $Z_1$ and $Z_2$ have the meanings given above, and the symbol

means that this place may be occupied by a hydrogen atom or a methyl group and that at least one methyl group must be present in the molecule, in the presence of a strong basic alkali compound with a Schiff's base, the reaction medium being a strongly polar, neutral to basic organic solvent which (I) is free from atoms — especially hydrogen atoms — that can be replaced by alkali metal, and (II) is practically anhydrous, and if an alkali hydroxide is used as strongly basic alkali compound, such alkali hydroxide may have a water content of up to 25 percent.

As starting materials according to the above formula (7) there may be used, for example:

A. Compounds of formula (8)

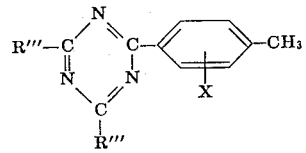

in which R''' denotes, for example, a monocyclic benzene residue and X a hydrogen atom, a chlorine atom, a methoxy group or a methyl group.

B. Compounds of the formula (9)

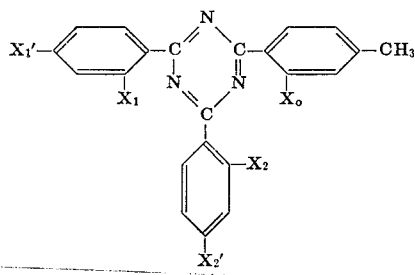

in which $X_0$, $X_1$, $X_2$, $X_1'$ and $X_2'$ denote methyl groups or hydrogen atoms.

C. Compounds of the formulae (10)

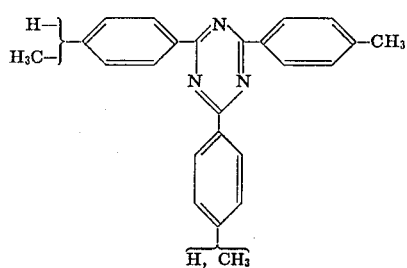

(11)

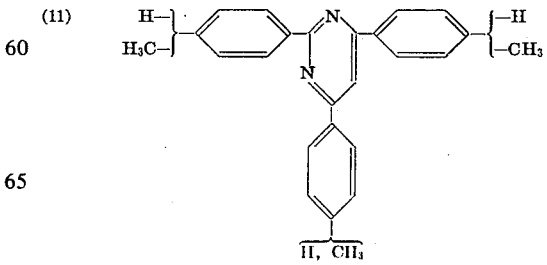

(12)

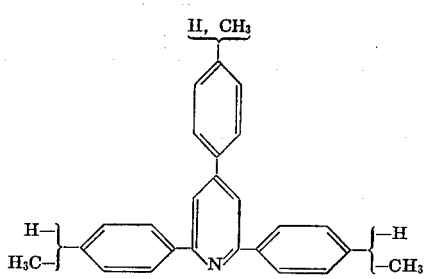

In the above formulae 1. terminal phenyl radicals may contain additional substituents of the series alkyl (especially with 1 to 4 carbon atoms), halogen (especially chlorine) or alkoxy (especially with 1 to 4 carbon atoms)

2. phenyl radicals on s-triazine rings may additionally contain methyl groups; moreover, the symbol

denotes that either a hydrogen atom or a methyl group, but in the entire molecule at least one methyl group, should be present.

The Schiff base to be used as the second reagent in the present process must, as will be obvious, be free of reactive methyl groups, for example those in the p-position to the azomethine grouping. Possible Schiff bases are, in turn, the (known) condensation products of aldehydes of aromatic character with primary amines (of aliphatic, aromatic or heterocyclic nature), whose amino group is bonded to a tertiary carbon atom. Compounds of this type may accordingly be written as azomethine compounds of formula (13)

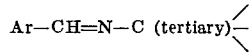

in which Ar denotes an aromatic residue. In this, either one or both of the components required for the synthesis of the Schiff bases (aldehyde and amine) may contain further substituents, provided the above restriction is observed. Since the amine, especially aniline, residue is split off during the reaction and is no longer present in the final product, the presence of substituents in this is generally not indicated and is uninteresting. Nevertheless substituents which do not interfere with, or hinder, the reaction, for example chorine atoms, may be present in this ring also. Preferred interest attaches to Schiff bases of aromatic aldehydes with anilines, that is to say aromatic aldehyde-anils. Such anils for example correspond to the formula (14)

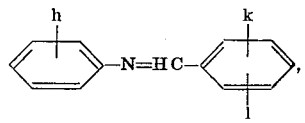

in which $k$ and $l$ may be identical or different and denote hydrogen atoms, chlorine atoms or methoxy groups and in which $h$ represents chlorine or, preferably, hydrogen. Adjacent $k$ and $l$ may together also form a —O—CH$_2$—O— group. Another important variant of aromatic anils corresponds to the formula (15)

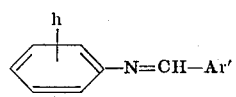

in which $h$ (as above) represents a hydrogen atom or chlorine and Ar′ denotes a naphthyl or diphenyl residue. As monoaldehydes suitable for the synthesis of these Schiff bases there may be quoted for example: aldehydes of the benzene series such as benzaldehyde or its halogenated analogues, such as the monochloro-analogues and dichloro-analogues, alkoxybenzaldehydes such as p-methoxy-benzaldehyde, alkylated benzaldehydes, provided these do not contain any p-methyl groups, such as toluyl-aldehyde, xylyl-aldehyde and cumoyl-aldehyde, methylenedioxy-benzaldehyde (piperonal), 4-dimethylamino-benzaldehyde, 4-diethylamino-benzaldehyde, and diphenyl-aldehyde; aldehydes of the naphthalene series such as α- and β-naphthaldehyde.

Compounds of formula (7) are reacted with the aldehydeanils in the presence of a strongly polar, neutral to alkaline, organic solvent which is free of atoms, especially hydrogen atoms, which are replaceable by alkali metals. Such solvents are especially represented by di-alkylated acylamides, preferably those of the type $$[(\text{Alkyl})_2 \text{N}]_w \text{—Acyl}$$

(16)

in which "Alkyl" denotes a lower alkyl group (containing 1 to 4 carbon atoms), especially a methyl group, "Acyl" the residue of a low carboxylic acid (containing 1 to 4 carbon atoms), especially formic acid or acetic acid, or of phosphoric acid, and $w$ gives the basicity of the acid. As important examples of such solvents there may be quoted dimethylformamide, diethylformamide, dimethylacetamide and hexamethyl-phosphoric acid-triamide. It is also possible to use solvent mixtures.

The reaction furthermore requires a strongly basic alkali compound. By the term strongly basic alkali compounds there are to be understood, within the framework of the present invention, such compounds of the alkali metals (I. main group of the periodic table of elements) including ammonium as have a basic strength of at least about that of lithium hydroxide. Accordingly, they may be compounds of lithium, sodium, potassium, rubidium, caesium or ammonium of, for example, the alcoholate, hydroxide, amide, hydride, sulphide or strongly basic ion exchanger types. Potassium compounds of composition $$\text{KOC}_{m-1}\text{H}_{2m-1}$$

(17)

in which $m$ denotes an integer of 1 to 6, such as for example potassium hydroxide or potassium tertiary-butylate, are advantageously used (above all when mild reaction conditions as regards reaction temperature appear to be indicated). In the case of alkali alcoholates and alkali amides (and hydrides) it is here necessary to work in a practically anyhydrous medium, whereas in the case of alkali hydroxides water contents of up to 25 percent (for example contents of water of crystallisation) are admissible. In the case of potassium hydroxide a water content of up to about 10 percent has proved appropriate. As examples of other alkali compounds which may be used there may be quoted sodium methylate, sodium hydroxide, sodium amide, lithium amide, lithium hydroxide, rubidium hydroxide, caesium hydroxide and the like. Of course it is also possible to work with mixtures of such bases.

It is appropriate to react the compounds of formula (7) with the aldehyde-anils in equivalent amounts, so that no component is present in significant excess. As regards the alkali compound, it is advantageous to use at least the equivalent amount, that is to say at least 1 mole, of a compound having, for example, a KO group, per mole of aldehyde-anil. When using potassium hydroxide a four-fold to eight-fold amount is preferably employed.

The reaction of the invention may generally be carried out at temperatures in the range of between about 10° and 150°C. If alcoholates are used as the potassium compound in the reaction, then the application of heat is generally not necessary. The procedure is, for example, that the aldehyde-aniline is added to the mixture of the compound of formula (7), the solvent and the potassium alcoholate, preferably with stirring and with exclusion of air, at a temperature of between 15° and 30°C, whereupon the reaction takes place of its own accord, with a slight temperature rise. When using potassium hydroxide it is frequently necessary to work at higher temperatures. For example the reaction mixture is slowly warmed to 30° - 100°C and then kept at this temperature for some time, for example ½ to 2 hours. The products may be worked up from the reaction mixture by usual methods which are in themselves known. Another process for the manufacture of such new triazinylstilbene compounds essentially consists in reacting in an anhydrous medium with the aid of Friedel-Crafts catalysts, such as aluminium chloride — or better yet aluminium chloride and thionyl chloride — in the molecular ratio of 1:2, stilbene-4-carboxylic acid halides, especially chlorides, if desired in the presence of inert non-polar to slightly polar organic solvents, as for example ortho-dichlorobenzene or tetrachlorethylene at a temperature near the boiling point of the reaction mixture, that is to say, at about 70° to 130°C, with corresponding aromatic nitriles R'''—C N (R''' as defined above) [cf. Berichte 89,223 (1956)]. It is of advantage to use an excess of aromatic nitrile — which at the same time serves as solvent. The intermediate products formed, if desired after being isolated, are treated, at a temperature of about 30° to 130°C (with ammonium chloride [cf. J. Chem. Soc. 1941, pages 278 to 282] or more advantageously with gaseous ammonia. The reaction sequence may be illustrated schematically for example for the manufacture of new compounds of the formula (2) as follows:

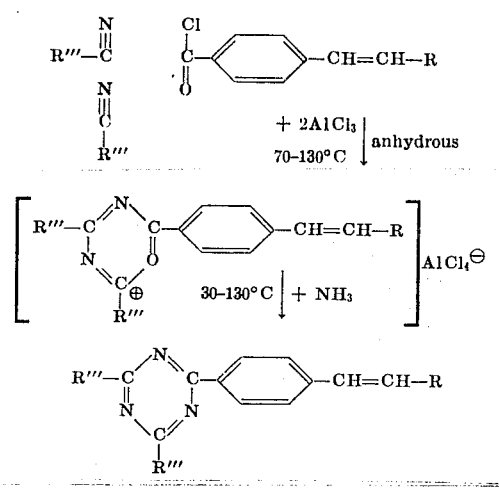

(2)

The new optical brighteners of the composition described above possess a more or less pronounced fluorescene in the dissolved or finely divided state. They are suitable for optical brightening of the most diverse organic materials of high or low molecular weight or of materials containing such organic substances.

As such materials there may for example be quoted the following group of organic materials, without the recital which follows in any way being intended to express any limitation in this respect:

I. Synthetic organic high molecular materials such as (a) polymerisation products based on organic compounds containing at least one polymerisable carbon-carbon double bond (homopolymers or copolymers as well as their post-treatment products such as cross-linking products, graft products or degradation products, polymer dilutions and the like) as examples of which there may be quoted: polymers based on $\alpha,\beta$-unsaturated carboxylic acids, especially acrylic compounds, (as for example acrylic esters, acrylic acids, acrylonitrile, acrylamides and their derivatives or their methacryl analogues), olefine hydrocarbons as for example ethylene, propylene, isobutylene, styrenes, dienes, as especially butadiene, isoprene, that is to say, also rubbus and rubber-like polymers, furthermore so-called "ABS"-polymers), polymers based on vinyl and vinylidene compounds (as for example vinyl esters, vinyl chloride, vinyl sulfonic acid, vinyl ether, vinyl alcohol, vinylidene chloride, vinyl carbazole) of halogenated hydrocarbons (chloroprene, highly halogenated ethylenes), of unsaturated aldehydes and ketones (for example acroleine, etc.), of allyl compounds, etc., graft polymerization products (for example by grafting on vinyl monomers), cross-linking products (for example by means of di- or polyfunctional cross-linking agents such as divinylbenzene, polyfunctional allyl compounds or bis-acryl compounds or by partial degradation (hydrolysis, de-polymerization) or modification products as are obtainable by modification of reactive groupings (for example esterification, etherification, halogenation, auto-cross-linking).

b. Other polymerization products, as are obtainable for example by ring opening, for example, polyamides of the polycaprolactam type, also formaldehyde polymers as well as polymers that are accessible both by polyaddition and polycondensation, such as polyethers, polythioethers, polyacetals, thioplasts.

c. polycondensation products or precondensates based on di- or polyfunctional compounds with condensable groups, their homo- and co-condensation products as well as after-treatment products, examples of which are:

Polyesters that are saturated (for example polyethylene terephthalate) or unsaturated (for example maleic aciddialcohol polycondensates and their cross-linking products with vinylmonomers that can be co-polymerized, or that are linear or branched (including those based on polyhydric alcohols, as for example alkyl resins);

Polyamides (for example hexamethylene diamine adipate), maleinate resins, melamine resins, phenol resins, furan resins, carbamide resins or their precondensates and similarly built products, polycarbonates, silicon resins and others.

d. Polyaddition products, such as polyurethanes (cross-linked and not cross-linked), epoxide resins.

II. Semisynthetic organic materials as for example cellulose esters or mixed esters (acetale, propion etc.), nitrocellulose, cellulose ethers, regenerated cellulose (oiscose, cuprammonium cellulose) or their after-treatment products, casein plastics.

III. Natural organic materials of animal or vegetable origin, for example based on cellulose or on proteins such as wool, cotton, silk, raffia, jute, hemp, pelts, hair, leather, wood compositions in a finely devided form, natural resins (such as colophony, especially lacquer resin), and furthermore rubber, guttapercha, balata as well as their post-treatment products and modification products (for example by curing, cross-linking or grafting), degradation products (for example by hydrolysis, de-polymerization), products obtainable by modification of reactive groups (for example by acylation, halogenation, cross-linking, etc.).

The organic materials requiring consideration may be present in the most diverse processing states (raw materials, semi-finished goods or finished goods) and states of aggregation. They may thus be present in the form of the most diverse shaped articles, for example, predominantly three-dimensional bodies, such as blocks, tablets, profiles, tubes, injection mouldings or the most diverse working pieces, chips, granules, and foams; predominantly two-dimensional bodies, such as films, foils, lacquers, strips, coverings, impregnations and coatings, or predominantly one-dimensional bodies, such as filaments, fibers, flocks, bristles, and wires. The materials quoted may on the other hand also be present in an unshaped state in the most diverse homogeneous and inhomogeneous forms of distribution and states of aggregation, for example as powders, solutions, emulsions, dispersions, latices (examples: lacquer solutions, polymer dispersions), sols, gels, putties, pastes, waxes, adhesives and trowelling compositions and the like. Fibre materials may for example be present as continuous filaments, staple fibres, flocks, hanks, yarns, threads, fibre fleeces, felts, waddings, flocked structures, woven textile fabrics or laminates, knitted fabrics as well as papers, cardboards or paper compositions and the like. The compounds to be used according to this invention are important also for the treatment of organic textile material, especially fabrics. The brightening according to this invention of fibers which as staple fibers or monofils may be in the form of hanks, fabrics, knitted goods, fleeces, flocked substrates or textile laminates is advantageously performed in an aqueous medium which contains the compound concerned in a finely divided state (suspension or solutions.) If necessary, a dispersant may be added during the treatment, as for example soap, a polyglycol ether of a fatty alcohol, a fatty amine or an alkylphenol, sulfite cellulose waste liquor or a condensation product of an optionally alkylated naphthalene sulfonic acid with formaldehyde. Working in a neutral, slightly alkaline or acid bath has provided especially advantageous. It is also of advantage to perform the treatment at a temperature of about 50° to 100°C, for example at the boiling temperature of the bath or near it (about 90°C). For the processing according to this invention solutions in organic solvents can also be used. When used as brighteners, these compounds may be added to the materials quoted either before or during shaping. Thus for example they may be added to the moulding composition in the manufacture of films, foils, tapes, or other moulded articles, or they may be dissolved, dispersed or otherwise finely divided in the spinning composition before spinning. The optical brighteners may also be added to the starting substances, reaction mixtures or intermediate products for the manufacture of fully synthetic or semi-synthetic organic materials, that is to say also before or during the chemical reaction, for example in the case of a polycondensation (thus also to precondensates), a polymerisation (thus also to prepolymers) or a polyaddition. The new optical brighteners may of course also be employed in all cases where organic materials of the type indicated above are combined with inorganic materials in any form. (Typical Examples: detergents, white pigments in organic substances). They are distinguished by exceptionally good heat stability, light fastness and resistance to migration. The amount of the new optical brighteners to be used, relative to the material to be optically brightened, may vary within wide limits. A clear and durable effect can already be achieved with very small amounts, in some cases for example with amounts of 0.001 percent by weight. However amounts of up to about 0.5 percent by weight and more may also be used. For most practical purposes amounts of between 0.01 and 0.2 percent by weight are preferably of interest.

The compounds serving as brighteners may for example also be employed as follows:

a. mixed with dyestuffs or pigments or as an additive to dye baths, printing, etching or reserve pastes. Further also for the post-treatment of dyeings, prints or discharge prints;

b. mixed with so-called "carriers," antioxidants, light protection agents, heat stabilisers, chemical bleaching agents or as an additive to bleaching baths;

c. mixed with cross-linking agents, finishing materials such as starch or synthetically produced finishes. The products of this invention can with advantage also be added to liquors used to produce anit-crease dressings;

d. in combination with detergents, where the detergent and the brightener may be separately added to the wash baths to be used, or preferably detergents are used which contain the brightener mixed into them; suitable detergents are for example soaps, salts of sulfonate washing agents, as for example salts of sulfonated benzimidazoles substituted on the 2-carbon atom by higher alkyl radicals, also salts of monocarboxylic acid esters of 4-sulfophthalic acid with higher fatty alcohols, furthermore salts of fatty alcohol-sulfonates, alkylarylsulfonic acids or condensation products of higher fatty acids with aliphatic hydroxy- or aminosulfonic acids. It is also possible to use non-ionic detergents, for example polyglycol ethers derived from ethylene oxide and higher fatty alcohols, alkyl phenols or fatty amines;

e. in combination with polymeric carriers (polymerization, polycondensation or polyaddition products), in which the brighteners are optionally introduced along with other substances in a dissolved or dispersed form, for example in the case of coating, impregnating or binding agents (solutions, dispersions, emulsions) for textiles, fleeces, paper, leather.

f. as additives to the most diverse industrial products in order to make these more marketable or to avoid disadvantages in their usability, for example as an additive to glues, adhesives, paints and the like.

The compounds of the formula first above shown may also be used as scintillators for various photographic purposes, such as for electrophotographic reproduction or for supersensitisation.

When the brightening process is combined with other treatments or processing methods, the treatment is advantageously performed with the use of corresponding stable preparations. Such preparations are characterized by a content of an optical brightener of the general formula shown at the beginning and also a dispersant, a detergent, a carrier, a dyestuff, a pigment or a dressing agent.

The treatment of a number of fibrous substrates, for example polyester fibers, with the brighteners of this invention advantageously consists in impregnating these fibers with an aqueous dispersion of the brightener at a temperature below 75°C, for example at room temperature and then subjecting them to a dry heat treatment at a temperature above 100°c, it being as a rule advisable previously to dry the fiber material at a moderately raised temperature, for example at at least 60°C to about 100°C. the heat treatment in the dry state is then advantageously performed at a temperature between 120° and 225°C, for example by heating in a drying chamber, ironing within the indicated temperature range or by treatment with dry, superheated steam. Alternatively, the drying operation and the dry heat treatment may be performed one immediately succeeding the other or simultaneously as one operation.

In the tables which follow later on, symbols have the following significance:
Column I = formula number
Column II = structural elements
Column III = crude yield in %
Column IV = recrystallisation medium, with these being designated by the numbers listed below: 1 = water, 2 = ethanol, 3 = dioxane, 4 = dimethylformamide, 5 = tetrachlorethylene, 6 = chlorobenzene, 7 = o-dichlorobenzene, 8 = trichlorobenzene, 9 = toluene, 10 = n-hexane, 11 = xylene.
Column V = colour of the purified reaction of product, with the latter having been designated by the numbers listed below: 1 = colourless, 2 = almost colourless, 3 = pale green, 4 = light green, 5 = pale yellow, 6 = light yellow, 7 = yellow, 8 = pale greenish yellow, 9 = light greenish yellow, 10 = greenish yellow.
Column VI = melting point (uncorrected) in °C.
Column VII = elementary formula and analytical date (upper line calculated, lower line found).

The starting materials (or the methods for their preparation) to be used for preparing the compounds in the following examples are known in the art (see Helvetica Chimica Acta, Vol: 50, Fasc. 3, pages 946 to 957).

MANUFACTURING INSTRUCTIONS

A. 10.8 g of 2,4-diphenyl-6-[4'-methylphenyl (1')]-1,3,5-triazine of formula

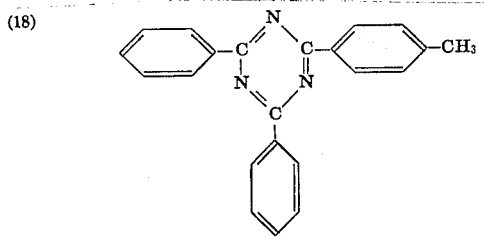

and 7.05 g of 4'-methoxybenzalaniline are stirred into 200 ml of anhydrous dimethylformamide with exclusion of air and treated all at once with 11.2 g of potassium tertiary-butylate. The colour of the reaction mixture changes immediately from light beige to bluish violet and the temperature rises by a few °C over the course of 2 minutes. The mixture is stirred for a further 1 hour without external warming during which the temperature again drops somewhat. Thereafter 400 ml of water are added dropwise at 10° to 15°C and the reaction mixture is filtered and washed with water until neutral.

The moist filter residue is now dissolved in 120 ml of dimethylformamide with warming, treated with 25 ml of 10 percent strength hydrochloric acid and after a few minutes with 120 ml of water and cooled to about 10°C. After filtering, washing with water and methanol and subsequent drying about 14.7 g, corresponding to 100 percent of theory, of 2,4-diphenyl-6-[4''-methoxystilbenyl-(4')]-1,3,5-triazine of formula

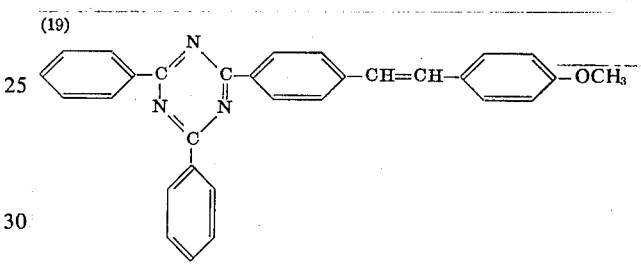

are obtained in the form of a yellow powder of melting point 243.5° to 246.5°C. After chromatography in tetrachlorethylene on activated aluminium oxide and recrystallisation from dioxane-ethanol, pale greenish yellow felted small needles of melting point 235.5°C are obtained.

Analysis: $C_{30}H_{23}ON_3$ (441,51) Calculated: C 81.61, H 5.25, N 9.52; found: C 81.70, H 5.38, N 9.45.

B. 11.7 g of 2,4,6-tri-[4'-methylphenyl-(1')]-1,3,5-triazine of formula

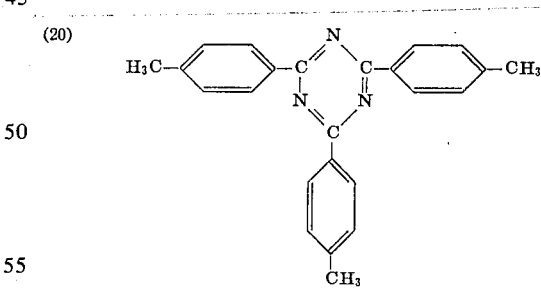

and 18.1 g of benzalaniline are stirred into 350 ml of anhydrous dimethylformamide with exclusion of air and treated all at once with 28.0 g of potassium tertiary-butylate. The colour of the reaction mixture changes immediately from pale yellow to violet and the temperature rises over the course of 5 minutes by about 10°C. The mixture is stirred for a further 1½ hours without external warming, during which the termperature again drops. Thereafter 350 ml of water are added dropwise at 10° to 20°C and the reaction product is filtered off and washed with water until neutral.

The moist filter residue is now dissolved in 500 ml of dimethylformamide with warming, treated with 50 ml of 10 percent strength hydrochloric acid and thereafter with 500 ml of water. The mixture is cooled to about 10°C, filtered off, and the residue first washed with water, then with methanol and dried. About 20.4 g, corresponding to 99.5 percent of theory, of 2,4,6-tri-[stilbenyl-(4')]-1,3,5-triazine of formula triazine of formula (148), 18.1 g of benzalaniline and 12.6 g of potassium hydroxide powder containing about 10 percent water are stirred into 300 ml of dimethylformamide with exclusion of air, in the course of which a dark blue colour is produced after a few minutes. The temperature is raised to 90°C over the course of 1 hour, and the mixture stirred for a further 40 minutes at this temperature and then cooled to about 10°C. Now 100 ml of water, 150 ml of 10 percent strength

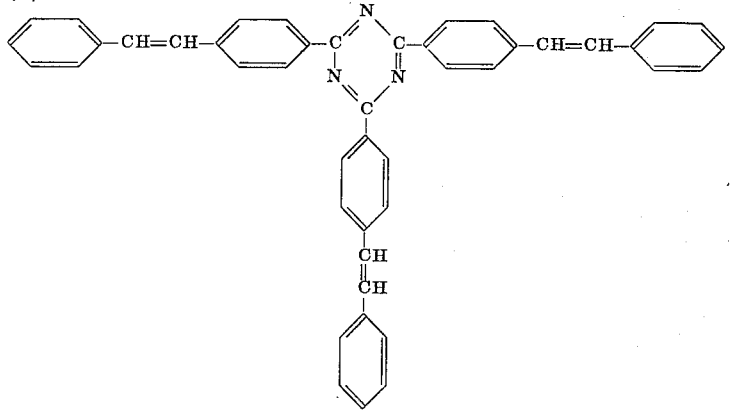

(21)

are obtained in the form of light yellow very fine small needles which melt at 251° to 254°C. After four recrystallisations from tetrachlorethylene with the aid of Fuller's earth light greenish yellow small needles of melting point 275° to 277°C are obtained.

Analysis: $C_{45}H_{33}N_3$ (615.78). Calculated: C 87.77, H 5.40 N 6.82; found: C 87.56, H 5.50, N 6.96.

If instead of 18.1 g of benzalaniline 21.1 g of 4'-methoxybenzalaniline are used, then about 22.7 g, corresponding to 96.6 percent of theory, of 2,4,6-tri-[4''-methoxy-stilbenyl-(4')]-1,3,5-triazine of formula hydrochloric acid and a further 250 ml of water are successively added dropwise at 10° to 20°C. The precipitated reaction product is filtered off, washed with water until neutral and freed of a by-product by further washing with methanol. After drying about 19.7 g, corresponding to 96.2 percent of theory, of 2,4,6-tri-[stilbenyl-(4')]-1,3,5-triazine of formula (149) are obtained in the form of a yellow powder which melts at 262° to 267°C. After chromatography in tetrachlorethylene on activated aluminum oxide and subsequently three recrystallisations from tetrachlorethylene, light

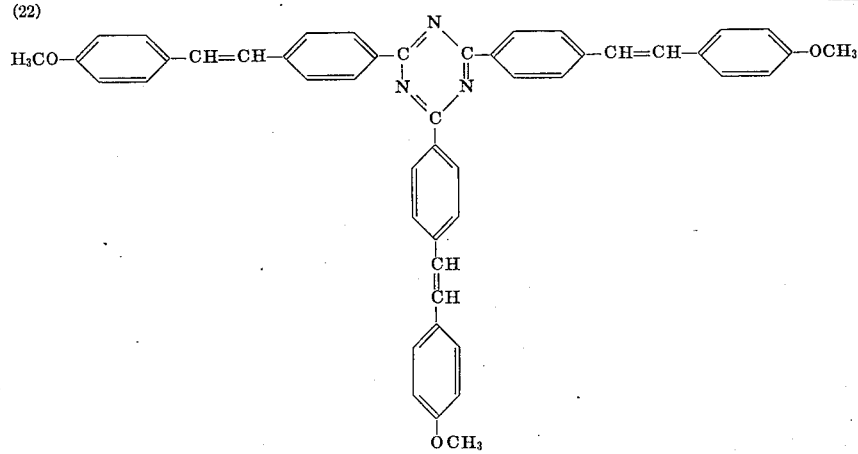

(22)

are obtained in the form of a yellow powder of melting point 263.5° to 265°C. After chromatography in o-dichlorobenzene on activated aluminium oxide and two recrystallisations from tetrachlorethylene yellow very fine small needles of melting point 300°C are obtained.
Analysis: $C_{48}H_{39}O_3N_3$ (705.82). Calculated: C 81.68, H 5.57, N 5.95; found: C 81.53, H 5.51, N 5.87.

C. 11.7 g of 2,4,6-tri-[4'-methylphenyl-(1')]-1,3,5- greenish yellow felted small needles of melting point 293° to 293.5°C are obtained.

Analysis: $C_{45}H_{33}N_3$ (615.78). Calculated: C 87.77, H 5,40, N 6.82; found: C 87.55, H 5.55, N 6.98.

If instead of the 18.1 g of benzalaniline 25.73 g of diphenyl-(4)-aldehyde-anil are used and the reaction is carried out for 30 minutes at 60°C, then the 2,4,6-tri-[4''-phenyl-stilbenyl-(4')]-1,3,5-triazine of formula (23)

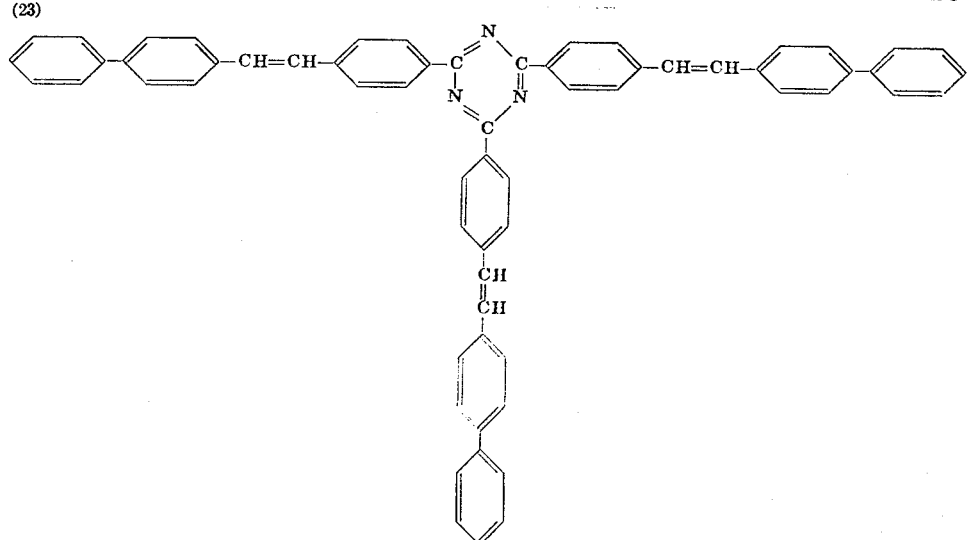

is obtained, Yield: 93.1 percent of theory. Greenish yellow crystals from o-dichlorobenzene. Melting point: 361° to 362°C.

Analysis: $C_{63}H_{45}N_3$ (844.67). Calculated: C 89.65, H 5.37, N 4.98; found: C 89.74, H 5.28, N 5.10.

The following stilbenyl-1,3,5-triazine derivatives may be prepared in a similar manner: From 2,4,6-tri-[4'-methylphenyl-(1')-1,3,5-triazine of formula (148) and 4'-chlorobenzalaniline, the compound of formula (24)

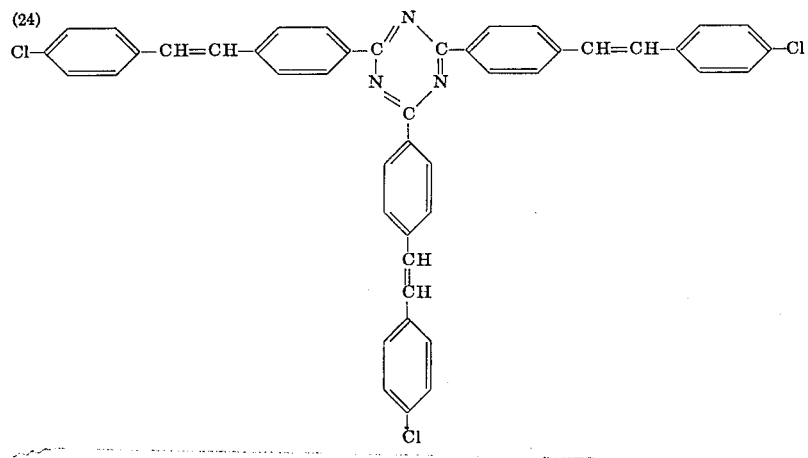

Yield: 94.0 percent of theory. Light yellow very fine small needles from tetrachlorethylene. Melting point: 315° to 317°C.

Analysis: $C_{45}H_{30}N_3Cl_3$ (719.12). Calculated: C 75.16, H 4.21, N 5.84; found: C 75.17, H 4.22, N 6.00. From 2,4-diphenyl-6-[4'-methylphenyl-(1')]-1,3,5-triazine of formula (146) and diphenyl-(4)-aldehyde-anil, the compound of formula (25)

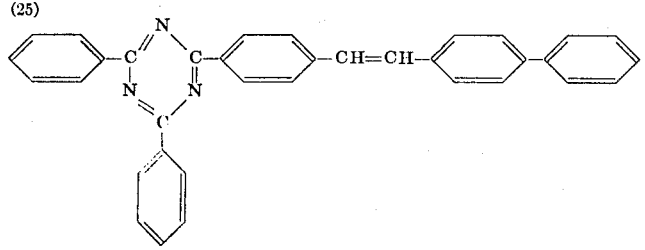

Yield: 98.5 percent of theory. Light yellow very fine needles from tetrachlorethylene. Melting point: 284 to 285°C.

Analysis: $C_{35}H_{25}N_3$ (487.57). Calculated: C 86.21, H 5.17, N 8.62; found: C 86.35, H 5.28, N 8.54.

From 2,4,6-tri-[2',4'-dimethyl-phenyl-(1')]-1,3,5-triazine of formula (26)

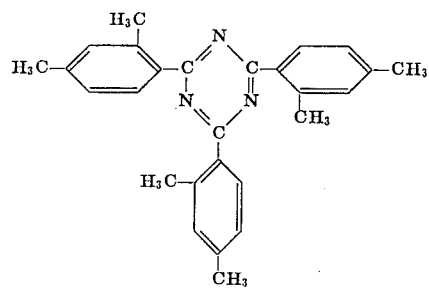

and diphenyl-(4)-aldehyde-anil, the compound of formula

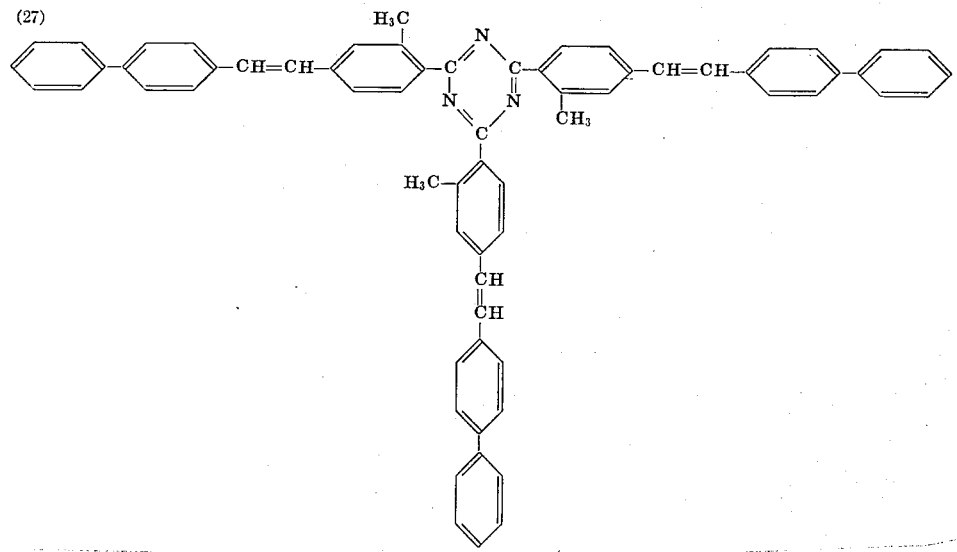

Yield: 100 percent of theory. Yellow very fine small needles from xylene. Melting point: 162° to 162.5°C. Analysis: $C_{66}H_{51}N_3$ (886.16). Calculated: C 89.46, H 5.80, N 4.74; found: C 89.16, H 5.83, N 4.68.

D. 16.87 g of 2,4-di-[4′-methylphenyl-(1′)]-6-phenyl-1,3,5-triazine of formula

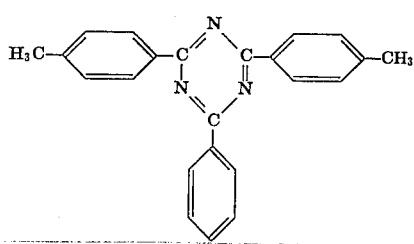

[Melting point: 218 to 218.5°C], 18.1 g of benzalaniline and 50 g of potassium hydroxide powder containing about 10 percent water are stirred into 400 ml of dimethylformamide with exclusion of air, during which a violet colour is produced after a few minutes. The temperature is raised to 60°C over the course of 30 minutes, and the mixture stirred for a further 30 further at this temperature and then cooled to room temperature. Now 50 ml of water and 500 ml of 10 percent strength hydrochloric acid are successively added dropwise. The precipitated reaction product is filtered off, washed with water until neutral and freed of a by-product by further washing with 300 ml of methanol. After drying about 24.8 g, corresponding to 96.6 percent of theory, of 2,4-di-[stilbenyl-(4′)]-6-phenyl-1,3,5-triazine of formula

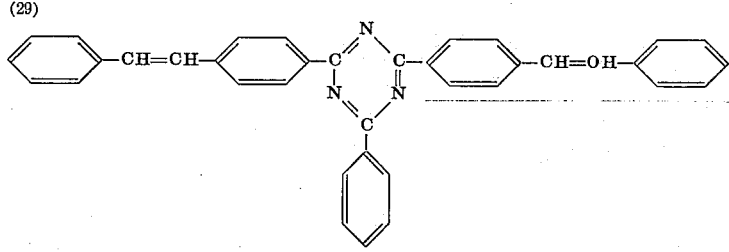

are obtained as a light yellow powder. After chromatography in tetrachlorethylene on activated aluminum oxide and recrystallisation from tetrachlorethylene practically colourless crystals of melting point 241° to 241.5°C are obtained.

Analysis: $C_{37}H_{27}N_3$ (513.61). Calculated: C 86.52, H 5.30, N 8.18; found: C 86.46, H 5.03, N 7.99.

The 1,3,5-triazine derivatives of formula

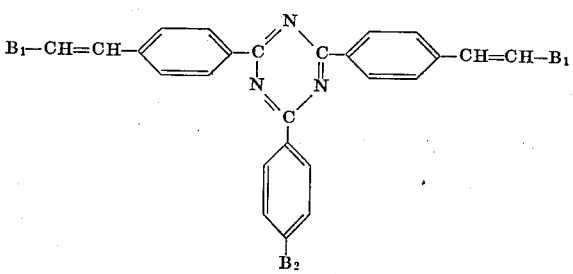

listed in the following Table may be produced in a similar manner.

| I | II B₁ | II B₂ | III | IV | V | VI | VII | | |
|---|---|---|---|---|---|---|---|---|---|
| 30 | –⟨phenyl⟩ | –C(CH₃)₃ | 97.0 | 9/10 | 6 | 230.5–231 | $C_{41}H_{35}N_3$ | | |
| | | | | | | | C, 86.43 | H, 6.19 | N, 7.38 |
| | | | | | | | C, 86.33 | H, 6.08 | N, 7.56 |
| 31 | –⟨phenyl⟩ | –⟨phenyl⟩ | 94.3 | 5 | 8 | 240.5–241 | $C_{43}H_{31}N_3$ | | |
| | | | | | | | C, 87.58 | H, 5.30 | N, 7.13 |
| | | | | | | | C, 87.44 | H, 5.55 | N, 7.13 |
| 32 | –⟨biphenyl⟩ | H | 94.9 | 7 | 9 | 351–352.5 | $C_{49}H_{35}N_3$ | | |
| | | | | | | | C, 88.39 | H, 5.30 | N, 6.31 |
| | | | | | | | C, 88.33 | H, 5.43 | N, 6.28 |
| 33 | Same as above | –C(CH₃)₃ | 98.0 | 3/2 | 10 | 325–328 | $C_{53}H_{43}N_3$ | | |
| | | | | | | | C, 88.18 | H, 6.00 | N, 5.82 |
| | | | | | | | C, 88.37 | H, 6.28 | N, 5.80 |
| 34 | do | –⟨phenyl⟩ | 91.7 | 7 | 2 | 359–360 | $C_{55}H_{39}N_3$ | | |
| | | | | | | | C, 89.04 | H, 5.30 | N, 5.66 |
| | | | | | | | C, 88.08 | H, 5.51 | N, 5.73 |

E. 6.42 g of 4-[4'-methyl-phenyl-(1')]-2,6-diphenyl-pyridine of formula

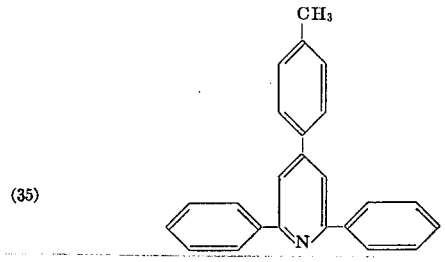

(35)

3.7 g of benzalaniline and 10 g of potassium hydroxide powder containing about 10 percent of water are stirred into 150 ml of dimethylformamide with exclusion of air. The temperature is raised to 60°C over the course of 30 minutes, during which a violet colour develops. The reaction mixture is stirred for a further 30 minutes at 60° to 65°C and then cooled to room temperature. Now 150 ml of water and 150 ml of 10 percent strength hydrochloric acid are successively added dropwise, with cooling. The precipitated reaction product is filtered off, washed with a great deal of cold water and 400 ml of methanol, and dried. About 4.9 g, corresponding to 59.8 percent of theory, of 4-[stilbenyl-(4')]-2,6-diphenyl-pyridine of formula

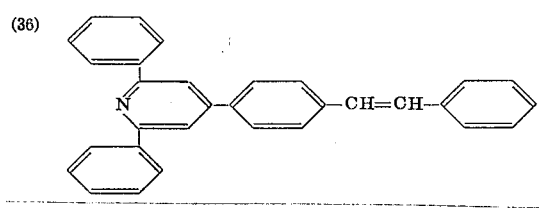

(36)

are obtained in the form of a pale yellow powder which melts at 168° to 170°C. Three recrystallisations from dioxane-ethanol, with the aid of activated charcoal, yield colourless very fine crystals of melting point 177.5° to 178°C.
Analysis: $C_{31}H_{23}N$ (409.50). Calculated: C 90.92, H 5.66, N 3.42; found: C 90.98, H 5.84, N 3.35.

In a similar manner 4-[4'-methyl-phenyl-(1')]-2,6-diphenyl-pyridine of formula (359), 4-phenyl-2,6-di-[4'-methyl-phenyl-(1')]-pyridine of formula (37)

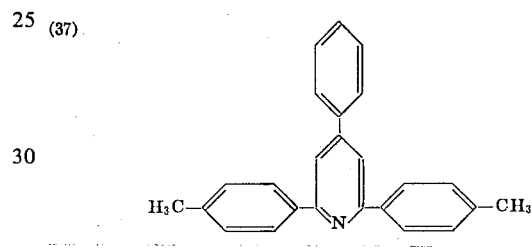

and 2,4,6-tri-[4'-methyl-phenyl-(1')]-pyridine of formula (38)

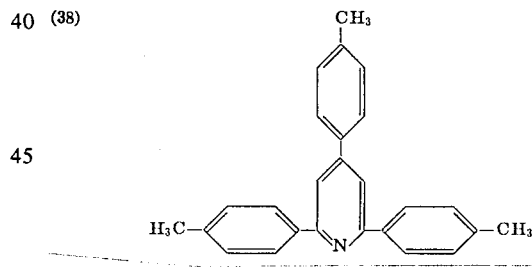

may be used to prepare the stilbenyl-pyridine derivatives of formula (5)

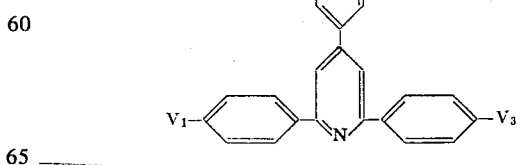

which are listed in the following table.

| I | II V₁ | V₂ | V₃ | III | IV | V | VI | VII | | |
|---|---|---|---|---|---|---|---|---|---|---|
| 39 | H | —CH=CH—(biphenyl) | H | 84.5 | 4 | 1 | 275–275.5 | C₃₇H₂₇N C, 91.51 C, 91.27 | H, 5.60 H, 5.46 | N, 2.88 N, 2.87 |
| 40 | —CH=CH—(phenyl) | H | —CH=CH—(phenyl) | 77.1 | 10/11 | 2 | 256–257 | C₃₉H₂₉N C, 91.55 C, 91.56 | H, 5.71 H, 5.89 | N, 2.74 N, 2.67 |
| 41 | —CH=CH—(biphenyl) | H | —CH=CH—(biphenyl) | 86.6 | 4 | 5 | 370–371 | C₅₁H₃₇N C, 92.27 C, 92.11 | H, 5.62 H, 5.80 | N, 2.11 N, 1.96 |
| 42 | —CH=CH—(phenyl) | —CH=CH—(phenyl) | —CH=CH—(phenyl) | 93.8 | 5 | 2 | 194.5–195 | C₄₇H₃₅N C, 91.97 C, 92.06 | H, 5.75 H, 5.84 | N, 2.28 N, 2.24 |
| 43 | —CH=CH—(biphenyl) | —CH=CH—(biphenyl) | —CH=CH—(biphenyl) | 96.3 | 7/4 | 5 | 347–350 | C₆₅H₄₇N C, 92.71 C, 92.73 | H, 5.63 H, 5.86 | N, 1.66 N, 1.73 |

F. 5.84 g of 2,4,6-tri-[4'-methyl-phenyl-(1')]-pyrimidine of formula (44)

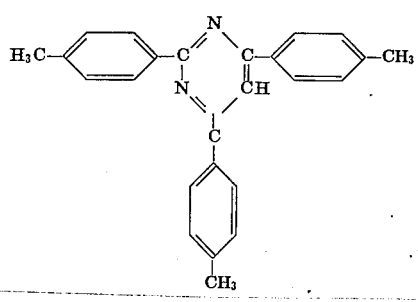

9.1 g of benzalaniline and 25 g of potassium hydroxide powder containing about 10 percent of water reacted in 300 ml of dimethylformamide according to the data of Example 30. About 9.9 g, corresponding to 79.5 percent of theory, 2,4,6-tri-[stilbenyl-(4')]-pyrimidine of formula (45)

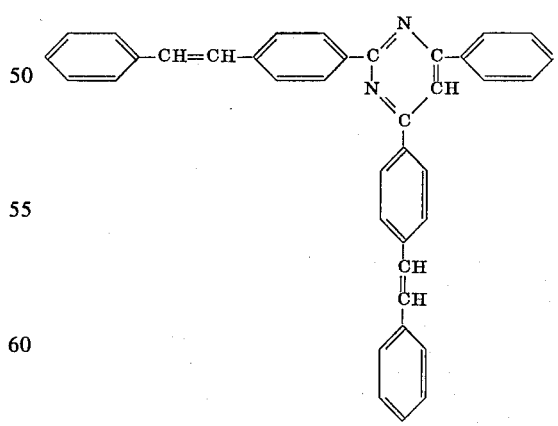

are obtained in the form of a light yellow powder. After three recrystallisations from xylene with the aid of Fuller's earth about 4.1 g, corresponding to 33 percent of theory, of light greenish yellow very fine small needles of melting point 247° to 248°C are obtained.

Analysis: $C_{46}H_{34}N_2$ (614.79). Calculated: C 89.87, H 5.57, N 4.56; found: C 89.89, H 5.63, N 4.68.

In a similar manner 2,4,6-tri-[4'-methyl-phenyl-(1')][-pyrimidine of formula (369) may be used to prepare the stilbenyl-pyrimidine derivatives of formula (6)

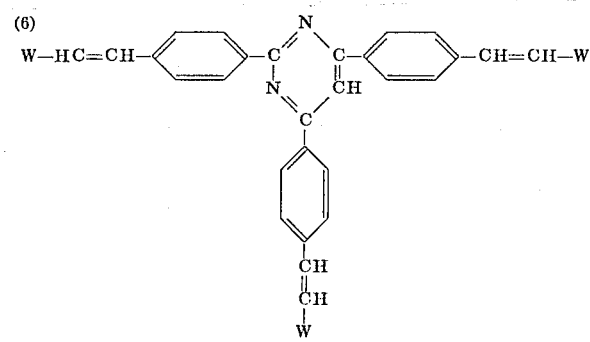

listed in the following table.

as a pale-yellow powder which melts at 233°–234°C. When the product is recrystallized twice from aqueous dioxan, with the use of active carbon, colourless, very fine crystals are obtained which melt at 245°–246°C.

| Analysis: $C_{31}H_{25}N_3$ (439.53) | | | |
|---|---|---|---|
| calculated | C 84.71 | H 5.73 | N 9.56% |
| | C 84.58 | H 5.87 | N 9.82% |

In a similar manner, the stilbenyl-1,3,5-triazine derivative of the formula (50)

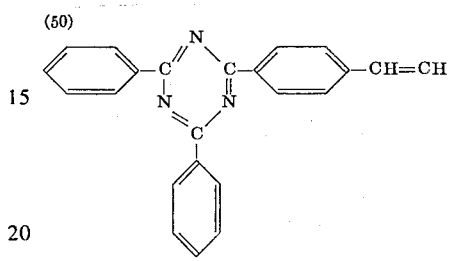

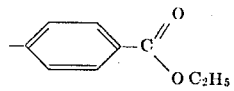

| I | II, W | III | IV | V | VI | VII | | |
|---|---|---|---|---|---|---|---|---|
| 46 | biphenyl | 97.5 | 7/4 | 10 | 345.5–347.5 | $C_{64}H_{46}N_2$ | | |
| | | | | | | C, 91.18 | H, 5.50 | N, 3.32 |
| | | | | | | C, 91.16 | H, 5.62 | N, 3.24 |
| 47 | naphthyl | 97.4 | 5/11 | 7 | 288–288.5 | $C_{58}H_{40}N_2$ | | |
| | | | | | | C, 91.07 | H, 5.27 | N, 3.66 |
| | | | | | | C, 91.05 | H, 5.38 | N, 3.46 |
| 48 | naphthyl | 100 | 7 | 6 | 281–281.5 | $C_{58}H_{40}N_2$ | | |
| | | | | | | C, 91.07 | H, 5.27 | N, 3.66 |
| | | | | | | C, 90.86 | H, 5.30 | N, 3.50 |

G. 12.1 g of stilbene-4-carboxylic acid chloride and 17.56 g of para-tolunitrile are stirred in 200 ml of dry ortho-dichlorobenzene. 6.6 g of aluminium chloride are added and the temperature of the reaction mixture is adjusted to 115°C once the exothermic reaction has subsided. 5.3 g of ammonium chloride are added and the batch stirred for 20 hours at 115°C. After cooling, the reaction mixture is poured into much cold water, washed neutral, freed from ortho-dichlorobenzene with steam, and an insoluble by-product removed by boiling with 1,500 ml of dimethylformamide. The filtrate is diluted with 1,000 ml of water, cooled to room temperature, filtered with suction and dried. There are obtained about 12.8 g, corresponding to 58.6 percent of the theory, of 2,4-di[4'-methylphenyl-(1')]-6-stilbenzyl-(4'')-1,3,5triazine of the formula (49)

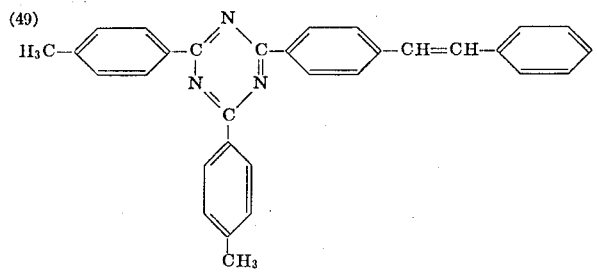

can be prepared. Yield: 54.1 percent of the theoretical. Pale-yellow, fine crystal powder from aqueous dimethylformamide.

| Melting point: 190° – 190.5°C. | | | |
|---|---|---|---|
| Analysis $C_{32}H_{25}O_2N_3$ (483.54) | | | |
| calculated: | C 79.48 | H 5.21 | N 8.69% |
| found: | C 79.43 | H 5.50 | N 8.56% |

EXAMPLE 1

A polyester fabric (for example "Dacron" is padded at room temperature (about 20°C) with an aqueous dispersion which contains per liter 2g of one of the compounds of the formulae (19), (21), (24), (25), (29), (30) to (34), (39), (41), (43), (45) and (46) to (48) and 1 g of an addition product of about 8 mols of ethylene oxide on 1 mol of paratertiary octylphenyl, then dried at about 100°C. The dry material is then subjected to a heat treatment at 150°–220°C which takes 2 minutes to a few seconds depending on the temperature. The treated material presents a much whiter aspect than untreated material.

EXAMPLE 2

100 Parts of a polyester granulate from terephthalic acid ethylene glycol polyester are intimately mixed with 0.05 part of one of the stilbene derivatives of the formulae (19), (21), (24), (25), (29), (30) to (34), (39), (41), (43), (45), (46) to (48) and melted at 285°C while stirring. The spinning solution gives much brightened polyester fibers when used for spinning through the usual spinnerets.

Alternatively, the aforementioned compounds may be added to the starting material before or during polycondensation to form the polyester.

EXAMPLE 3

10,000 Parts of a polyamide in chip form prepared in known manner from hexamethylenediamine adipate are mixed in a tumbler for 12 hours with 30 parts of titanium dioxide (rutile modification) and 2 parts of a compound of the formulae (19), (21), (24), (25), (29), (30) to (34), (39), (41), (43), (45), (46) to (48) or (50). In a boiler heated to 300° to 310°C with oil or diphenyl vapour, and in which the atmospheric oxygen has been replaced by superheated steam, the chips so treated are melted and stirred for half an hour. Under a nitrogen pressure of 5 atmospheres (gange), the melt is extruded through a spinneret and the resulting cooled filament wound on a bobbin. The filament obtained presents an excellent brightening effect.

We claim:

1. Process for the optical brightening of organic materials, wherein there is incorporated in these materials or applied to their surfaces, 0.001–0.5 percent by weight of a compound of the formula

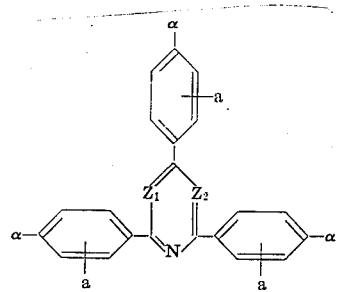

in which a represents hydrogen, halogen, the methyl group or the methoxy group, $Z_1$ and $Z_2$ each stands for a ring member =CH— or =N— and α for a hydrogen atom, phenyl or a radical of the series

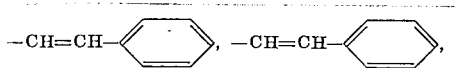

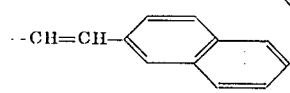

or

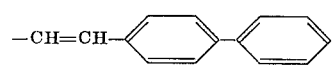

in which (I) at least one radical α differs from hydrogen or phenyl and has the significance of one of the other radicals quoted for α, and in which (II) terminal phenyl or naphthyl in said α substituents are unsubstituted or substituted by 1 to 3 $C_1$–$C_8$-alkyl groups, 1 to 2 halogen atoms, a $C_1$–$D_4$-alkoxy group, a carboxylic acid, carboxylic acid ester or carboxylic acid amide group.

2. Process according to claim 1, wherein there is used a triazine derivative of the formula

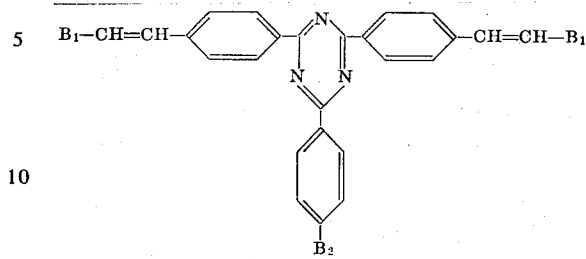

in which $B_1$ represents a phenyl or diphenyl and $B_2$ stands for hydrogen, phenyl or alkyl with 1 to 4 carbon atoms, and in which a terminal phenyl radical is unsubstituted or substituted by an alkyl group with 1 to 4 carbon atoms, a halogen atom, a carboxylic acid, carboxylic acid ester, or carboxylic acid amide group or a methoxy group.

3. Process according to claim 1, wherein there is used a compound of the formula

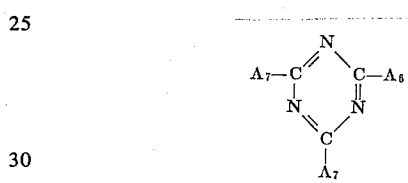

in which $A_6$ represents

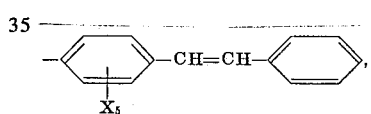

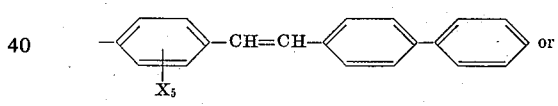 or

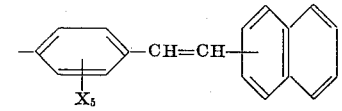

$A_7$ stands for a phenyl, diphenylyl, or $A_6$, and in which phenyl nuclei are unsubstituted or substituted by alkyl having 1 to 4 carbon atoms or halogen.

4. Process according to claim 1, wherein a pyridine derivative of the formula

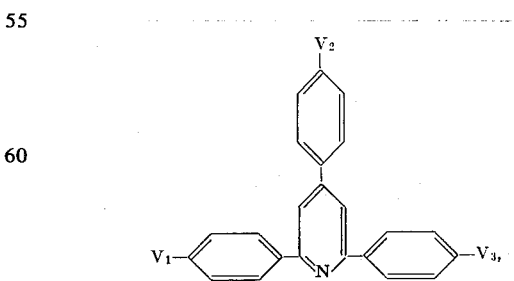

is used in which $V_1$, $V_2$ or $V_3$ each stands for (1) hydrogen, (2) unsubstituted styryl, (3) unsubstituted para-phenylstyryl or (4) styryl or para-phenylstyryl substituted on the aromatic ring by 1 to 3 $C_1$–$C_4$-alkyl groups, 1 to 2 halogen atoms, a $C_1$–$C_4$-alkoxy group, a carboxylic acid, carboxylic acid ester or carboxylic acid amide group, at least one radical V being different from hydrogen.

5. Process according to claim 1, wherein a pyrimidine derivative of the formula

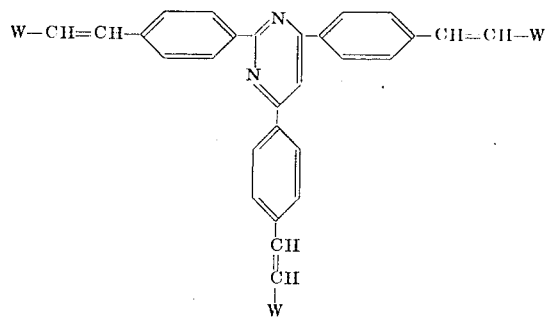

is used in which W represents (1) phenyl, diphenyl, 1-naphthyl or 2-naphthyl or (2) phenyl, diphenyl, 1-naphthyl or 2-naphthyl substituted by 1 to 3 $C_1$–$C_4$-alkyl groups, 1 to 2 halogen atoms, a $C_1$–$C_4$-alkoxy group, a carboxylic acid, carboxylic acid ester or carboxylic acid amide group.

6. Process according to claim 1, wherein a compound mentioned in same claim is incorporated in the material to be optically brightened before such material is shaped.

7. Process according to claim 1, wherein a compound mentioned in said claim is incorporated in a polycondensation product, prior to its shaping or subsequently applied to its surface.

8. Process according to claim 7, wherein the polycondensation product is a synthetic polyamide or an aromatic polyester.

* * * * *

UNITED STATES PATENT AND TRADEMARK OFFICE
CERTIFICATE OF CORRECTION

PATENT NO. : 3,849,163
DATED : November 19, 1974
INVENTOR(S) : ADOLF EMIL SIEGRIST ET AL It is certified that error appears in the above–identified patent and that said Letters Patent are hereby corrected as shown below:

Column 2, left-hand portion of formula (4c) should read:

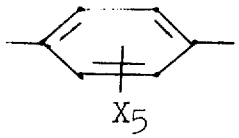

Column 6, line 41, after "hydroxide" delete the comma and substitute a period.

Column 7, line 38, "R'''-C N" should be --- R'''-C$\equiv$N ---.

Column 14, line 36, "(4)" should be --- (4') ---.

Column 15, line 28, "(1')-" should be --- (1')]- ---.

Column 17, line 65, delete "30 further" and substitute --- 30 minutes ---.

Column 20, opposite "33" under "VII", "$C_{53}H_{43}H_3$" should be --- $C_{53}H_{43}N_3$ ---.

Column 21, middle-center portion of formula (44) should be ---  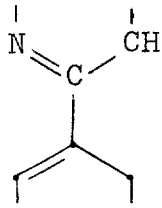  ---.

UNITED STATES PATENT AND TRADEMARK OFFICE
CERTIFICATE OF CORRECTION

PATENT NO. : 3,849,163                Page 2
DATED : November 19, 1974
INVENTOR(S) : ADOLF EMIL SIEGRIST ET AL It is certified that error appears in the above—identified patent and that said Letters Patent are hereby corrected as shown below:

Column 24, line 49, "C 79.43" should be --- C 79.54 ---.

Column 25, line 66, "$C_1-D_4$" should be --- $C_1-C_4$ ---.

Signed and Sealed this twenty-first Day of October 1975

[SEAL]

Attest:

RUTH C. MASON
*Attesting Officer*

C. MARSHALL DANN
*Commissioner of Patents and Trademarks*